March 23, 1926.

J. A. SCHARWATH 1,577,495

HEAT INSULATING MATERIAL

Filed May 20, 1921

Inventor
John A. Scharwath
By His Attorney
E. W. Marshall

Patented Mar. 23, 1926.

1,577,495

UNITED STATES PATENT OFFICE.

JOHN A. SCHARWATH, OF ELIZABETH, NEW JERSEY, ASSIGNOR, BY MESNE ASSIGNMENTS, TO THE SEABOARD NATIONAL BANK OF THE CITY OF NEW YORK, TRUSTEE.

HEAT-INSULATING MATERIAL.

Application filed May 20, 1921. Serial No. 471,278.

To all whom it may concern:

Be it known that I, JOHN A. SCHARWATH, a citizen of the United States, and a resident of Elizabeth, Union County, and State of New Jersey, have invented certain new and useful Improvements in Heat-Insulating Materials, of which the following is a specification.

This invention relates to improvements in insulating material for use on pipes wherein are conveyed vapors or liquids such as steam or hot water for the purpose of causing the heat to less rapidly radiate therefrom and cause a loss of efficiency.

An object of the invention is to provide a cellular insulating material, the walls of which are impregnated with a solidifying liquid, which will harden and thereby strengthen the cellular covering, permitting it to better retain its original shape.

Another object is to close the ends of the covering with a heat resisting substance, thus sealing the ends of the cells of the covering to form dead air spaces, thus materially increasing its insulating efficiency.

It is old to provide a cellular covering for heat insulating wherein is made use of asbestos or other fibrous material. This invention relates specifically to improvements in coverings of this type and to improve them structurally and functionally by making them stronger and at the same time increasing their insulating quality.

Referring to the drawings.

Figure 1:
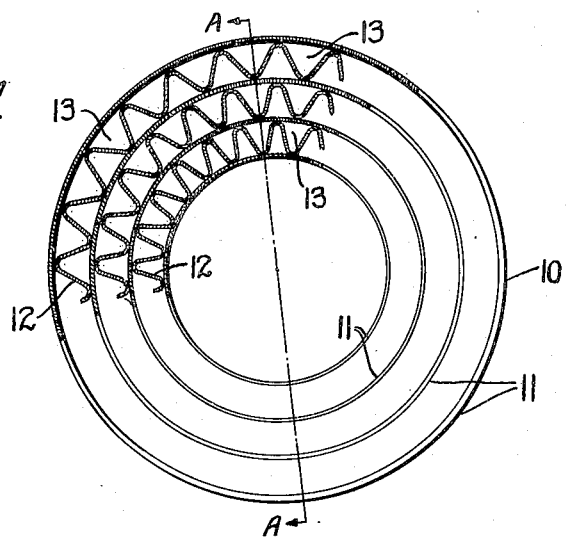
Figure 1 is a cross sectional view of a cellular insulating covering.
Figure 2:
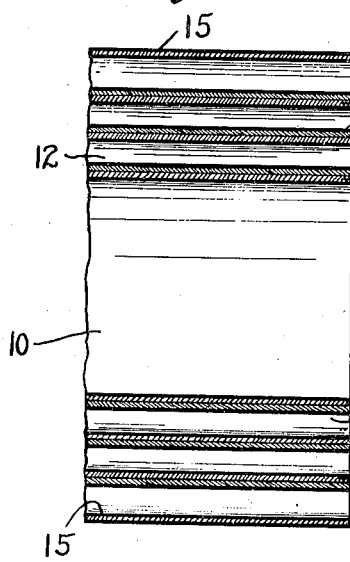
Figure 2 is a view taken on line A—A of Figure 1 and shows the result of impregnating the walls of a cellular covering with a solidifying liquid.
Figure 3:
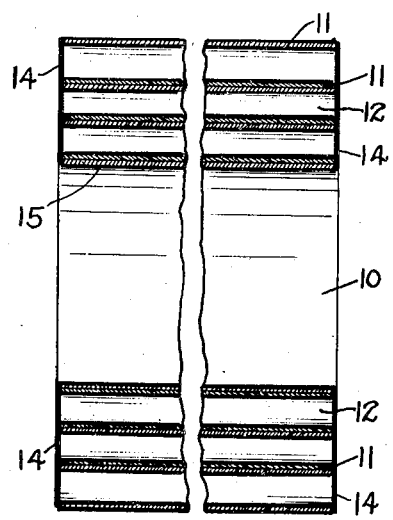
Figure 3 is a view taken on line A—A of Figure 1, but showing how the ends of the covering may be sealed with a solidifying material, which when dry, seals the ends of the cells.

Referring more particularly to the drawings, 10 designates a portion of a cylindrical cellular pipe covering, all of the parts of which are made of asbestos. Spaced cylinders 11, of which there may be any desired number are separated by corrugated cylinders 12. It is well known that the corrugations provide strength, which is a necessary factor in pipe covering, as it is subject to more or less rough handling and exposure. The corrugated tubes together with the smooth ones form cells or air channels 13, so that a cellular covering is provided, in the air channels of which may be retained after sealing the ends, "dead" air or air having no circulation and which will not conduct away as much heat as if the air cells or channels were not sealed.

The method of sealing the ends of the air channels or cells 13 consists of dipping the ends of the covering into, or otherwise applying, a solution of asbestos fibre and liquid silicate of soda, or other solidifying heat resisting mixture 14.

It is also desirable to strengthen the walls of the insulation, and at the same time, to render them as smooth as possible, so that a minimum amount of surface can act as a heat radiator. To accomplish this the whole covering may be immersed in a solution of liquid silicate of soda, or other liquid which hardens upon exposure to air, or it may be a mixture similar in its properties to that with which the end of the tube is sealed. This solution permeates the walls of the covering and hardens when dried, thus rendering them smooth and glossy, and thereby reducing the amount of radiating surface found in the asbestos covering in its rough state. This also renders the walls tougher and the whole covering stronger and stiffer.

The covering may be rolled to form a pipe covering, or it may be formed flat. The whole covering may be dipped into the solution to render the walls harder, or just the ends may be sealed up, or both treatments may be combined in the one covering, according to the various uses to which it will be put, and different properties desired.

What I claim is:

1. A rigid cellular heat insulating unit comprising a plurality of layers of like material impregnated with a solidifying heat resisting compound to render the unit rigid and smooth, said unit having its cells closed by walls formed with said heat resisting compound.

2. A rigid cellular heat insulating unit comprising alternate smooth and corrugated rigid layers of like material impregnated with a solidifying heat resisting compound, said unit having end closures formed with said heat resisting compound.

3. A rigid tubular cellular heat insulating unit comprising alternate smooth and corrugated cylindrical layers of like material impregnated with and made rigid by a solidifying non-fusible heat resisting compound and having end closures formed with solidified layers of said heat resisting compound.

In witness whereof, I have hereunto set my hand this 6th day of May 1921.

JOHN A. SCHARWATH.